United States Patent
Davis et al.

(10) Patent No.: US 7,505,243 B2
(45) Date of Patent: **\*Mar. 17, 2009**

(54) MAGNETIC LEVITATION APPARATUS

(75) Inventors: Harold Davis, Vancouver (CA); Lorne A. Whitehead, Vancouver (CA)

(73) Assignee: Levitation Arts, Inc, Boerne, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/958,954

(22) Filed: Dec. 18, 2007

(65) Prior Publication Data

US 2008/0218929 A1 Sep. 11, 2008

Related U.S. Application Data (63) Continuation of application No. 10/529,507, filed as application No. PCT/CA03/01501 on Sep. 29, 2003, now Pat. No. 7,348,691.

(60) Provisional application No. 60/413,881, filed on Sep. 27, 2002.

(51) Int. Cl.
 *H01H 47/00* (2006.01)

(52) U.S. Cl. ..................................... 361/144
(58) Field of Classification Search ................. 361/144
See application file for complete search history.

(56) References Cited

U.S. PATENT DOCUMENTS

| 5,168,183 | A  | * | 12/1992 | Whitehead | .................... | 310/12 |
| 6,595,041 | B2 | * | 7/2003  | Hansen    | ....................... | 73/53.01 |
| 7,348,691 | B2 | * | 3/2008  | Davis et al. | .................... | 310/12 |

\* cited by examiner

*Primary Examiner*—Stephen W Jackson
(74) *Attorney, Agent, or Firm*—Paul Adams; Ryan Kennedy (57) ABSTRACT

A magnetic levitation apparatus supports a magnetic element in a magnetic field. A control system controls a variable magnetic field to maintain the magnetic element at an equilibrium location relative to an unstable axis. In some embodiments the variable magnetic field has a gradient in the direction of the unstable axis but no field component. In some embodiments the magnetic field is provided by an array of four discrete magnets. In some embodiments additional magnets provide increased field intensity at the equilibrium location this increases stability of the levitated magnetic element against overturning. Light and electrical power may be supplied to the levitating magnetic element.

25 Claims, 9 Drawing Sheets

MAGNETIC LEVITATION APPARATUS

CROSS REFERENCE TO RELATED APPLICATIONS

The present application is a continuation of Magnetic Levitation Apparatus, Ser. No. 10/529,507 filed on Mar. 28, 2005, which claims priority to international application PCT/CA03/01501, which claims priority to U.S. patent application No. 60/413,881 filed Sep. 27, 2002, all of which are entirely incorporated by reference herein.

TECHNICAL FIELD

The invention relates to apparatus for levitating magnetic elements.

BACKGROUND

A levitated object is interesting to observe and can be useful in various applications. Magnetic fields provide one tool which can be used for levitating magnetic objects. According to Earnshaw's theorem, it is not possible to support a magnetic object in a stable manner using only static magnetic fields. One statement of Earnshaw's theorem is that a levitated magnet cannot be held in stable equilibrium by any combination of static magnetic or gravitational forces.

Whitehead, U.S. Pat. No. 5,168,183 discloses a magnetic levitation system in which an arrangement of magnets on one side of a separation plane can support a levitated magnetic element on an opposite side of the separation plane. The magnetic arrangement provides a static magnetic field such that, for displacements of the levitated element in directions parallel to a stability plane, the potential energy of the magnetic interaction between the levitated element and the static magnetic field increases. The magnetic arrangement includes a control system which controls a variable force, which may be a variable magnetic field, to stabilize the levitated element in a direction perpendicular to the stability plane.

The inventors have determined that the magnetic fields generated by the embodiments disclosed by Whitehead tend to apply torque to levitated magnetic elements. This is because the magnetic dipole of the levitated magnetic element aligns generally with the static magnetic field while the variable magnetic field used to control the position of the levitated magnetic element in the "unstable" direction is directed generally perpendicularly to the static magnetic field at the equilibrium location of the levitated magnetic element. The rotation caused by this torque can lead to combined torsional and translational oscillation of the levitated element. In some cases this adversely affects stable feedback control and thus the stability of the levitated magnetic element.

There is a need for magnetic levitation systems of the general type disclosed by Whitehead which have desirable operating characteristics, such as increased stability of the levitated magnetic element, and/or are simple in construction. For certain applications, there is a particular need for such levitation systems which incorporate a reduced amount of magnetic material and can be made at relatively low cost.

SUMMARY OF THE INVENTION

One aspect of the invention provides apparatus for levitating a magnetic element. The apparatus comprises at least two magnets arranged to generate a static magnetic field providing a position-dependent potential energy of interaction with a magnetic element. In certain embodiments the at least two magnets include four magnets arranged in a diamond pattern. The static magnetic field provides an equilibrium location wherein the potential energy decreases for displacements of the magnetic element away from the equilibrium location along an unstable axis and increases for displacements of the magnetic element away from the equilibrium location in any direction perpendicular to the unstable axis. The apparatus includes a position sensor generating a feedback signal indicative of the location of the magnetic element on the unstable axis, an electromagnet configured to generate a control magnetic field upon the passage of an electrical current through the electromagnet, the control magnetic field having a gradient with respect to displacements along the unstable axis at the equilibrium location, and, a controller connected to receive the feedback signal and to control the electrical current in the electromagnet to prevent the magnetic element from leaving a vicinity of the equilibrium location.

In some embodiments the electromagnet comprises at least two coils spaced along an axis parallel to the unstable axis. For example, the electromagnet may comprise four coils spaced along an axis parallel to the unstable axis wherein upon the passage of the electrical current through the four coils each of the four coils has a magnetic polarity opposite to the magnetic polarity of adjacent ones of the four coils.

A specific embodiment provides an apparatus wherein the at least two magnets comprise first and second magnets spaced apart from one another by a first distance, D1, in a direction parallel to the unstable axis and third and fourth magnets spaced apart from one another by a second distance, D2, in a direction transverse to the unstable axis, wherein D1<D2, each of the first and second magnets is equidistant from an axis of symmetry of the at least two magnets and each of the third and fourth magnets is equidistant from the axis of symmetry. Each of the first, second, third and fourth magnets may have a first magnetic pole facing toward the equilibrium location and a second magnetic pole facing away from the equilibrium location. The first magnetic poles of the first, second, third and fourth magnets may be substantially coplanar.

Another aspect of the invention provides apparatus for levitating a magnetic element. The apparatus comprises means for generating a static magnetic field providing a position-dependent potential energy of interaction with a magnetic element, the static magnetic field providing an equilibrium location wherein the potential energy decreases for displacements of the magnetic element away from the equilibrium location along an unstable axis and increases for displacements of the magnetic element away from the equilibrium location in any direction perpendicular to the unstable axis. The apparatus also comprises means for generating a feedback signal indicative of the location of the magnetic element on the unstable axis and control means for directing the magnetic element to the equilibrium location by providing a quadrupole control magnetic field at the equilibrium location in response to the feedback signal.

Further aspects of the invention and features of specific embodiments of the invention are described below.

BRIEF DESCRIPTION OF THE DRAWINGS

In drawings which illustrate non-limiting embodiments of the invention.

DETAILED DESCRIPTION OF THE PREFERRED EMBODIMENTS

Throughout the following description, specific details are set forth in order to provide a more thorough understanding of the invention. However, the invention may be practiced without these particulars. In other instances, well known elements have not been shown or described in detail to avoid unnecessarily obscuring the invention. Accordingly, the specification and drawings are to be regarded in an illustrative, rather than a restrictive, sense.

Figure 1:
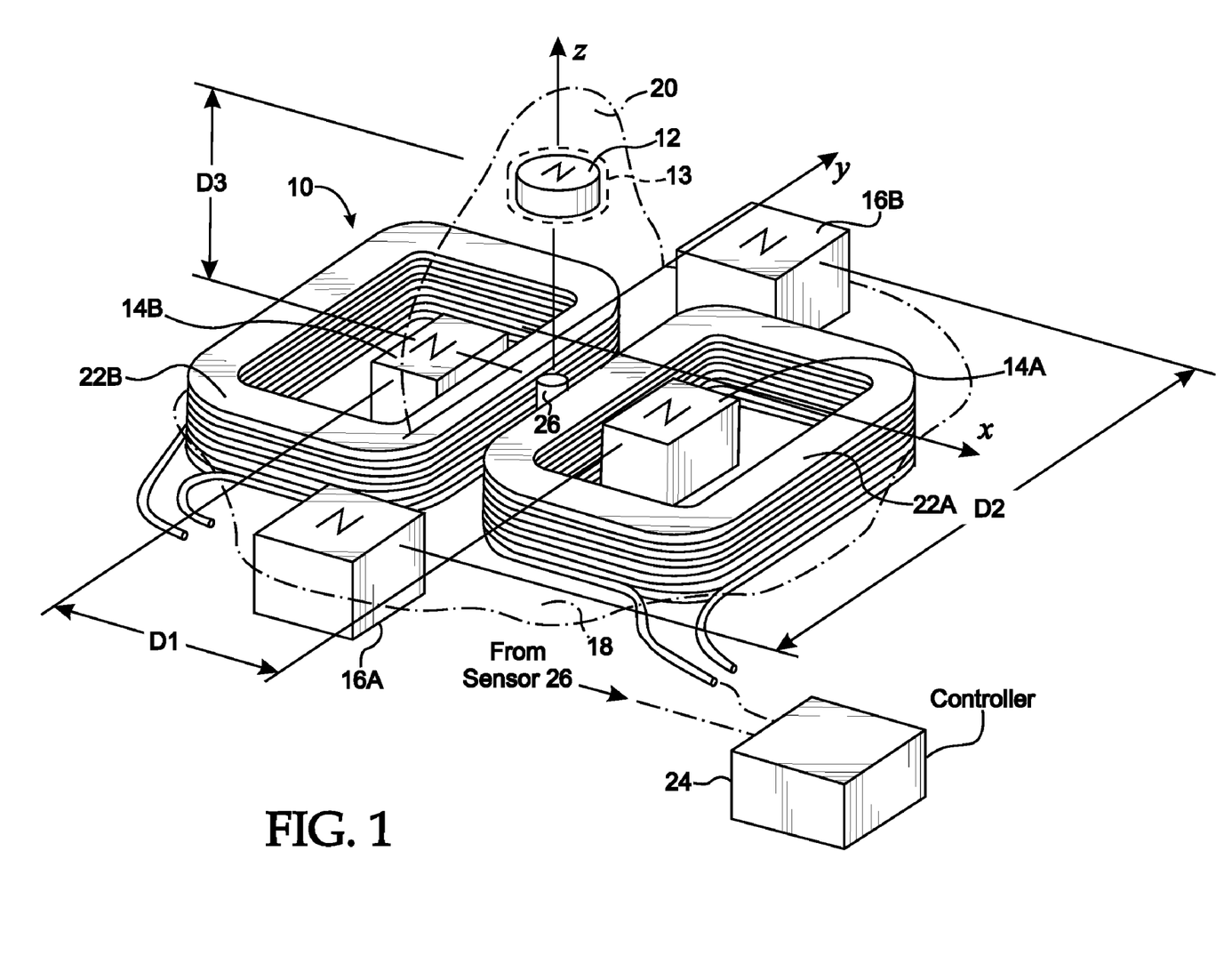
FIG. 1 is a partially schematic view of a magnetic levitation system according to one embodiment of the invention.

FIG. 1 shows a magnetic levitation system 10 according to the invention. System 10 is shown levitating a magnetic element 12 at an equilibrium location 13. Magnetic element 12 comprises a magnetic dipole or an array of magnetic dipoles. Magnetic element 12 may comprise a permanent magnet attached to a lightweight body to be levitated.

System 10 comprises a first pair of magnets 14 (individually 14A and 14B) spaced apart by a distance D1 and a second pair of magnets 16 (individually 16A and 16B) spaced apart by a distance D2 with D2>D1. In currently preferred embodiments of the invention, the ratio D2:D1 is in the range of 1.5:1 to 2:2.

Magnets 16, which are further apart than magnets 14, preferably have dipole moments larger than or equal to those of magnets 14. The magnetic dipole moments of magnets 16 are preferably large enough to substantially counteract the undesirable curvature of the field lines of the magnetic field that would be present in the absence of magnets 16, but not so large as to counteract the levitating field of the less-powerful magnets 14, which has much higher gradients due to the proximity of magnets 14 to equilibrium location 13. Preferably magnets 14A and 14B have the same magnetic strength as one another and magnets 16A and 16B have the same magnetic strength as one another. The strength, $M_{14}$ of magnets 14 is preferably less than or equal to the strength, $M_{16}$, of magnets 16. The ratio of $M_{16}:M_{14}$ is in the range of 1:1 to 2:1 in some embodiments of the invention.

Magnets 14 are ideally arranged so that magnets 14A and 14B are disposed a first axis and magnets 16A and 16B are disposed on a second axis orthogonal to the first axis. In the following description, magnets 14 and 16 are all shown as being adjacent a plane 18. A Cartesian coordinate system having orthogonal x and y axes in plane 18 and a z axis normal to plane 18 has its origin located symmetrically relative to magnets 14 and 16. The x axis extends through magnets 14 and they axis extends through magnets 16. The z axis of the coordinate system of the illustrated system 10 provides a symmetry axis of system 10. The z axis extends through equilibrium location 13, which is a distance D3 away from plane 18.

While FIG. 1 shows the ideal case where magnets 14 and 16 are located on orthogonal axes, some deviation from this ideal arrangement is possible without departing from the invention. In the illustrated embodiment, magnets 14 and 16 are arranged in a diamond pattern. The establishment of a Cartesian coordinate system is done only for convenience in describing the configuration of the illustrated apparatus. Other coordinate systems could be used.

Magnets 14 and 16 are preferably small in size compared to the distances between magnets 14, 16 and equilibrium location 13 at which magnetic element 12 can be levitated by system 10. In his case, each of magnets 14 and 16 produces a magnetic field at equilibrium location 13 substantially the same as a field which would be produced by a single magnetic dipole at the location of the magnet 14 or 16.

Figure 1A:
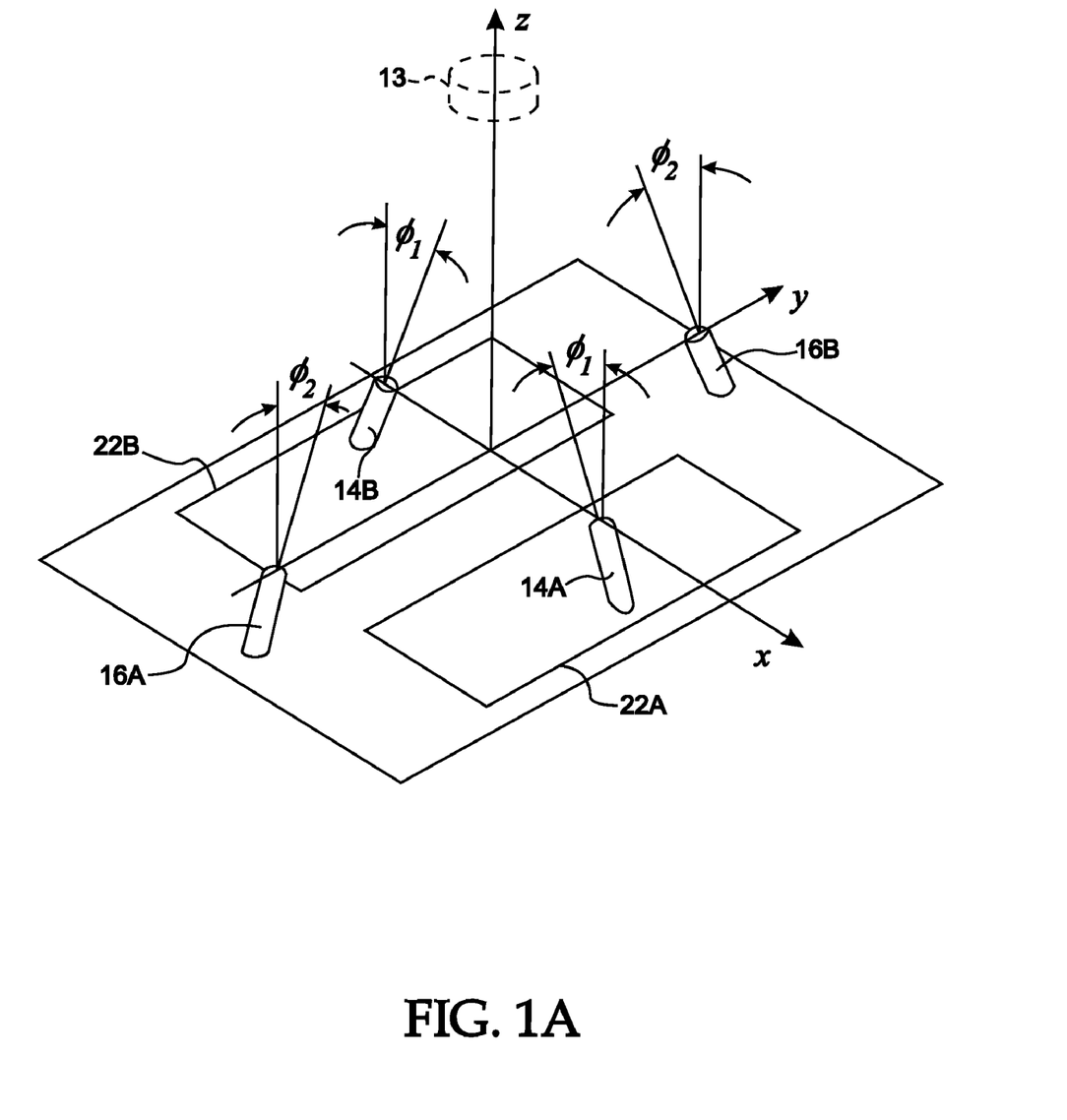
FIGS. 1A and 1B are partially schematic views of magnetic levitation systems according to alternative embodiments of the invention.

In the embodiment illustrated in FIG. 1, magnets 14 and 16 are all polarized in the same direction, which is parallel to the z axis. FIG. 1A shows schematically an alternative embodiment of the invention wherein each of magnets 14 are inclined toward the z axis at an angle, $\phi_1$, and each of magnets 16 are inclined toward the z axis at an angle, +2. In some embodiments $\phi_1$=+$\phi_2$ In other embodiments $\phi_1$ and $\phi_2$ are different from one another. Inclining magnets 14 and/or 16 toward the z axis, as shown in FIG. 1A tends to gain some "stiffness" in the levitation of magnetic element 12 with respect to motion in one direction at the expense of reduced stability in one or more other directions.

Magnets 14 and 16 have poles of a first polarity (for example, N) oriented in a first direction (for example, the +z direction) and poles of a second polarity (for example S) oriented in a second direction opposite to the first direction (for example, the −z direction).

Any suitable magnets may be used for magnets 14 and 16. Magnets 14 and 16 may, for example, comprise permanent magnets or electromagnets. Where system 10 is to be powered by batteries or another power supply that is limited in terms of total capacity or peak power, or in cases where it is desirable to minimize the electrical power consumption of system 10, magnets 14 and 16 are preferably permanent magnets. In some embodiments, magnets 14 and 16 comprise NdFeB, Barium Ferrite, Samarium Cobalt or AlNiCo magnets. Magnets 14 and 16 may each comprise an array of magnetic dipoles.

In the illustrated embodiment, the poles of magnets 14 and 16 which are closest to equilibrium location 13 are co-planar and all lie immediately adjacent to a plane 18. Magnets 14 and 16 may be mounted within a base 17 (See FIGS. 1B, 5 and 6). Magnets 14, 16 and base 17 may be thin in the z direction. In some embodiments base 17 has a thickness significantly less than D3. For example, base 17 may have a thickness of ½×D3 or less.

Magnets 14 and 16 generate a static magnetic field that supports magnetic element 12 in levitation at equilibrium location 13. The static magnetic field has gradients such that a potential energy of the magnetic interaction between levitated magnetic element 12 and the static magnetic field increases for small displacements of levitated magnetic element 12 from equilibrium location 13 in directions parallel to a stability plane 20 (illustrated as the y-z plane in FIG. 1).

Figure 2A:
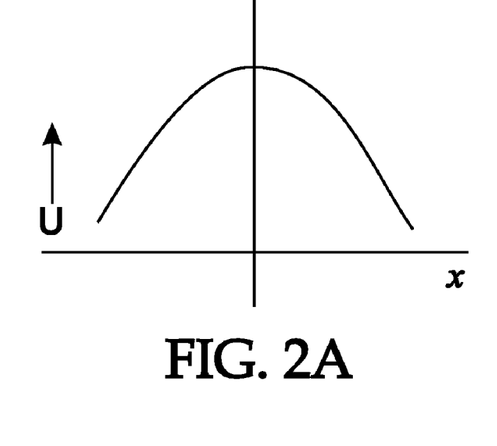
FIGS. 2A through 2C are plots which show variation of magnetic potential energy with displacement from the equilibrium location of a levitated magnetic element along x, y and z axes of the system of FIG. 1 respectively.
Figure 2B:
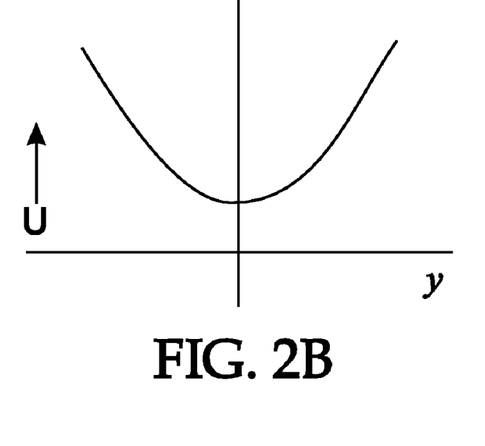
Figure 2C:
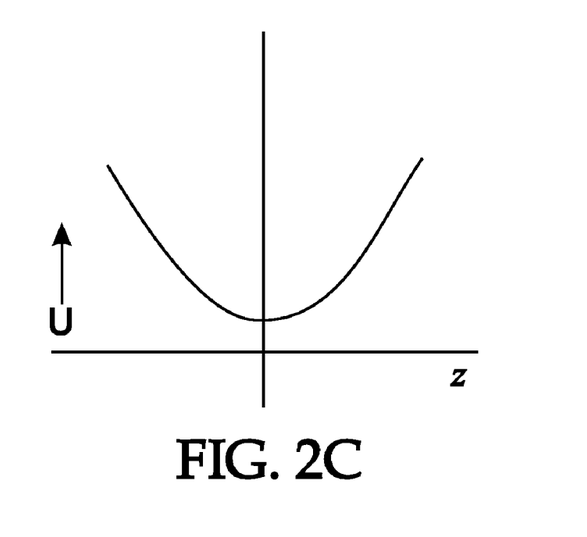

FIGS. 2A, 2B and 2C illustrate the variation of magnetic potential energy with position of magnetic element 12 for displacements along x, y and z axes respectively. It can be seen that the magnetic potential energy increases for displacements away from equilibrium location 13 along either of the y and z axes. Magnetic element 12 is therefore stable in respect of displacements along these axes. On the other hand, the magnetic potential energy decreases for displacements away from equilibrium location 13 in either direction along the x axis. Magnetic element 12 is therefore unstable in respect of displacements from equilibrium location 13 along the x axis.

System 10 includes control coils 22 (individually 22A and 22B) which generate a variable magnetic field under the control of a controller 24 (FIG. 1). When magnetic element 12 moves away from its levitated equilibrium position 13, controller 24 adjusts flow(s) of electrical current in the control coils to cause control coils 22 to generate a magnetic field that results in a force being applied to magnetic element 12. The force pushes magnetic element 12 in a selected direction along the unstable x axis. The variable magnetic field generated by the passage of electrical current in the control coils stabilizes levitated magnetic element 12 with respect to motions in the direction of the x axis. In the embodiment illustrated in FIG. 1, coils 22A, and 22B are adjacent to one another, have their centers spaced apart along the x axis, and each of coils 22 surrounds one of magnets 14.

A position sensor 26 provides a signal representative of the displacement of levitated magnetic element 12 on the unstable x axis to controller 24. In the illustrated embodiment, sensor 26 is located at the center of symmetry of system 10 directly below equilibrium location 13. Position sensor 26 may comprise a Hall effect sensor, for example. A Hall effect sensor may be oriented to detect the magnetic field intensity from levitated magnetic element 12 in a direction parallel to the x axis. When magnetic element 12 is located at equilibrium location 13 then the magnetic dipole of magnetic element 12 is aligned with the static magnetic field, which is oriented parallel to the z axis. The magnetic dipole of magnetic element 12 yields no net magnetic field component in a direction parallel to the x axis at the location of sensor 26. If magnetic element 12 moves along the unstable x axis in either direction then the field from its magnetic dipole, as detected at sensor 26, has a non-zero component in the x direction which increases with increasing displacement of magnetic element 12 from equilibrium location 13. Thus, the signal output by a Hall effect sensor 26 can be used to provide feedback to controller 24 regarding the position of magnetic element 12 along the unstable x axis.

Controller 24 adjusts current in coils 22 to maintain levitated magnetic element 12 at equilibrium location 13. Controller 24 may comprise any suitable control technology including a suitably programmed data processor such as a computer, programmable controller, or digital signal processor, or a suitable analog or digital feedback control circuit.

The distance D3 between equilibrium location 13 at which magnetic element 12 can be stably levitated and the plane 18 adjacent to magnets 14 and 16 may be varied by adjusting distance D1 between magnets 14A and 14B. Decreasing distance D1 slightly while magnetic element 12 is being levitated causes distance D3 to decrease while increasing the stability of magnetic element 12 with respect to displacements from equilibrium location 13 in stability plane 20 (i.e. the y-z plane in FIG. 1). Increasing distance D1 slightly while magnetic element 12 is being levitated causes distance D3 to increase while decreasing the stability of magnetic element 12 with respect to displacements from equilibrium location 13 in stability plane 20.

Preferably equilibrium location 13 is a position such that the static magnetic field of magnets 14 and 16 provides sufficient force to counteract the force of gravity on magnetic element 12 at equilibrium location 13 in the absence of current flowing in coils 22. Magnetic element 12 is unstable in the x direction. Coils 22 are operated to counteract any movement in the x direction of magnetic element 12 away from equilibrium location 13. In such embodiments it is only necessary to cause current to flow in coils 22 when magnetic element 12 has moved or is moving away from equilibrium location 13. This makes it possible to minimize the electrical power expenditure required to stabilize magnetic element 12 at equilibrium location 13.

Control coils 22 are arranged so that they can be operated to provide a magnetic field gradient (dBz/dx) near equilibrium location 13 sufficient to control the position of magnetic element 12 on the unstable x axis. The dimensions and locations of coils 22 may advantageously be chosen so that the magnitude of the magnetic field produced by coils 22 is very small in the vicinity of equilibrium location 13. This permits stabilization of magnetic element 12 without introducing significant transverse magnetic field components at the location of magnetic element 12 which would tend to rotate magnetic element 12. In practice, it is desirable that the components of the magnetic field from coils 22 in the x, y and z directions be as small as practical at equilibrium location 13 while having a gradient (dBz/dx) in the x direction large enough to provide sufficient force to control the position of magnetic element 12 on the x axis.

Figure 3:
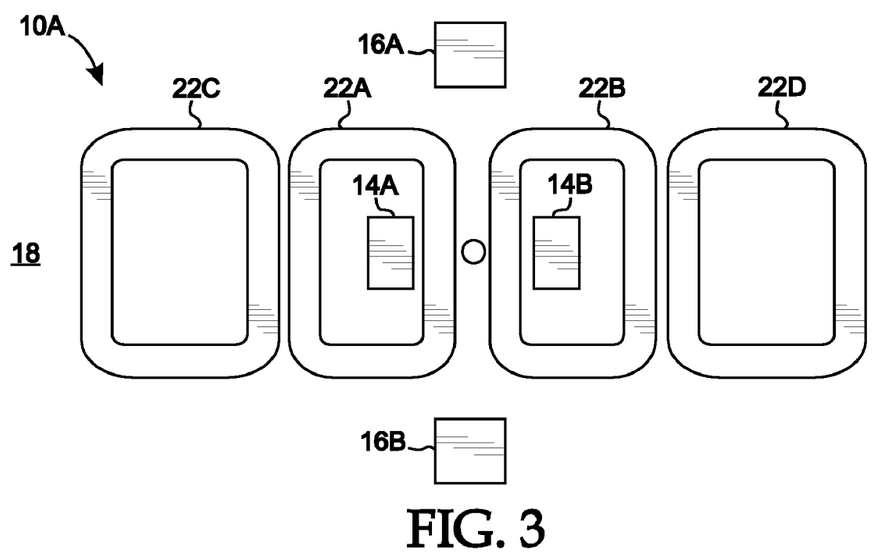
FIG. 3 is a top plan view of a magnetic levitation system having control coils arranged to generate a quadrupole field at a equilibrium location.

FIG. 3 illustrates a system 10A having one configuration of control coils 22 which minimizes the magnetic field from coils 22 in the vicinity of equilibrium location 13. The same reference numbers are used to indicate parts of system 10A which are also found in system 10 of FIG. 1. System 10A has four coils 22, coils 22A, 22B, 22C, and 22D. Coils 22A through 22D are rectangular coils arranged parallel to plane 18 and parallel to one another. The long sides of coils 22A to 22D extend parallel to the y axis and transversely to the unstable x axis. Coils 22A through 22D are arrayed symmetrically along the x axis. Magnets 14A and 14B may be within coils 22A and 22B respectively, as shown. Coils 22A through 22D are located symmetrically with respect to the y-z stability plane. Ideally coils 22A and 22B are close together, coils 22A and 22C are close together and coils 22B and 22D are close together. Coils 22C and 22D are preferably wider than coils 22A and 22B in their dimensions parallel to the x axis. In the illustrated embodiment, coil 22A has the same dimensions as coil 22B and coil 22C has the same dimensions as coil 22D.

It is desirable that at least those components of the magnetic fields generated by coils 22 which are parallel to plane 18 substantially cancel one another, at least in the vicinity of equilibrium location 13. This result may be produced by suitably choosing the dimensions of coils 22 and passing appropriate electric current(s) through coils 22 in appropriate senses. Electrical current passes through inner coils 22A and 22B in opposite senses to generate a stabilizing magnetic force on magnet 12. If the current passes through coil 22A in a clockwise sense, current must pass counterclockwise through coil 22B. At the same time, the current flow in coil 22C is counterclockwise and the current flow in coil 22D is clockwise. This creates a stabilizing magnetic field which applies force to urge magnetic element 12 in one direction along the unstable x axis. To create a stabilizing magnetic field which applies force to urge magnetic element 12 in the opposite direction along the unstable x axis, the sense in which current flows in each of coils 22 can be reversed.

The arrangement of coils 22 shown in FIG. 3 produces a magnetic quadrupole field at equilibrium location 13 when coils 22 have equal numbers of windings, suitable dimensions, and carry equal electrical currents flowing in the correct sense in each coil. A magnetic quadrupole is a point in space where the magnitude of a magnetic field is zero while the gradients of the magnetic field are linear and symmetric about the point. In this case, coils 22 cause a stabilizing magnetic force to be applied to magnetic element 12. The magnitude of the stabilizing force applied to magnetic element 12 is proportional to the magnitude of the gradient dBz/dx of the magnetic field at the location of magnetic element 12.

Figure 7:
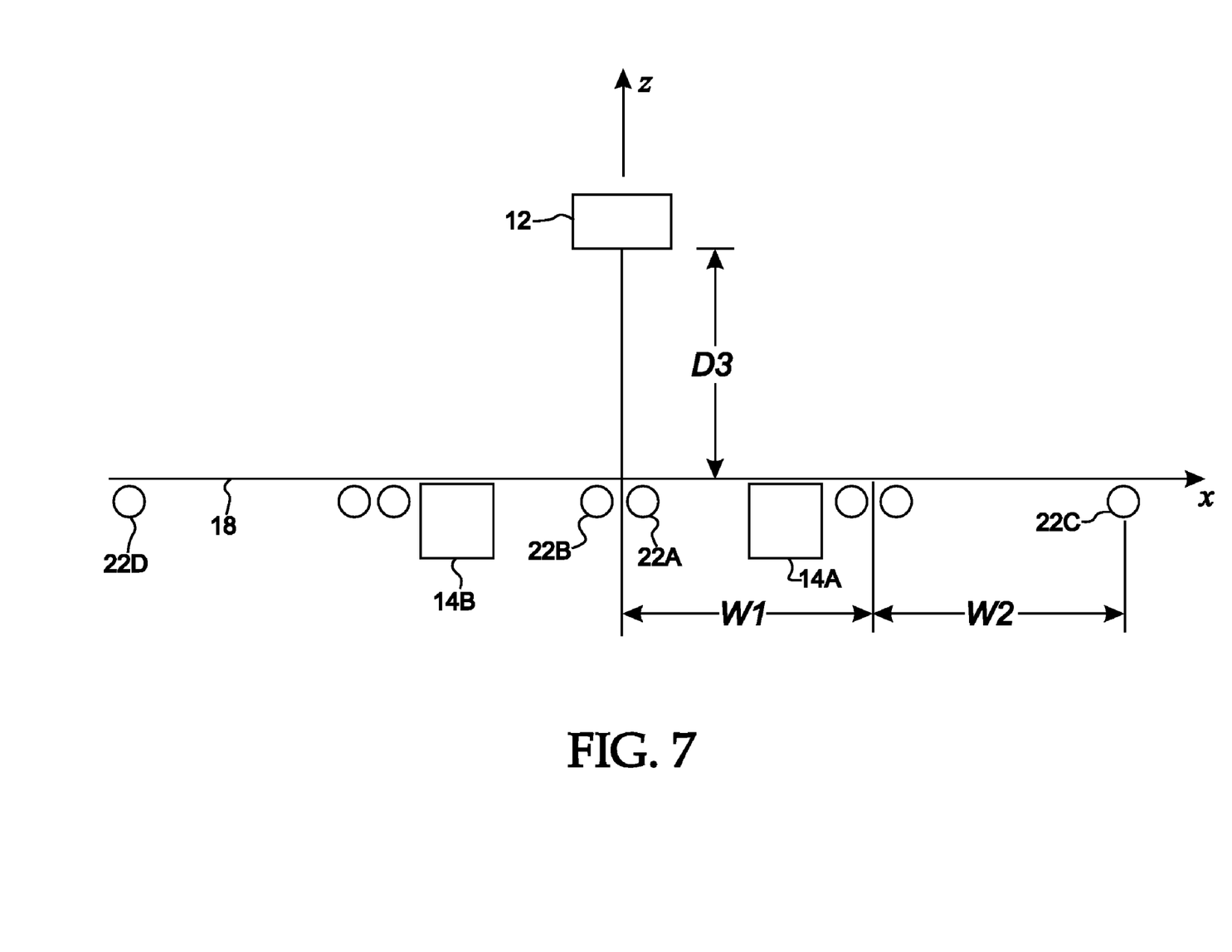
FIG. 7 is a section taken in the x-z plane through control coils of an embodiment of the invention; and, FIGS. 8A and 8B show coil geometries according to alternative embodiments of the invention.

FIG. 7 is a section taken in the x-z plane through coils 22. For coils 22 to produce a quadrupole field at equilibrium location 13 it is desirable that coils 22A and 22B have equal widths W1, coils 22C and 22D have equal widths W2 and that W1 be related to W2 and the distance D3 by W1=D3 and W2≧D3. All of coils 22 may have the same length. The length of each coil 22 in the direction transverse to the unstable x axis is greater than its width.

Controller 24 preferably inhibits the operation of system 10 in case magnetic element 12 is not detected by sensor 26 as being in the vicinity of equilibrium location 13. For example, if magnetic element 12 crashes it is desirable to prevent controller 24 from attempting to correct the position of magnetic element 12 by passing electrical current through coils 22. This would waste energy, could cause coils 22 to overheat, and in an extreme case could damage the control circuits which supply power to coils 22. Controller 24 may be configured to switch to an inactive mode whenever the signal from sensor 26 indicates that magnetic element 12 is not within a desired distance of equilibrium location 13. Controller 24 may be configured to remain in the inactive mode until reset. System 10 may include a reset switch which can be operated by a user to reset controller 24.

In some cases it can be desirable to provide additional magnets which add to the strength of the static magnetic field at equilibrium location 13. The stability of magnetic element 12 against overturning moments increases with the strength of the static magnetic field at equilibrium location 13. This is because the magnetic dipole of magnetic element 12 tends to align itself with the surrounding magnetic field. If the magnetic dipole of magnetic element 12 becomes misaligned with the magnetic field then magnetic element 12 experiences a corrective torque. The magnitude of the corrective torque is proportional to the strength of the magnetic field at the location of magnetic element 12.

Figure 4:
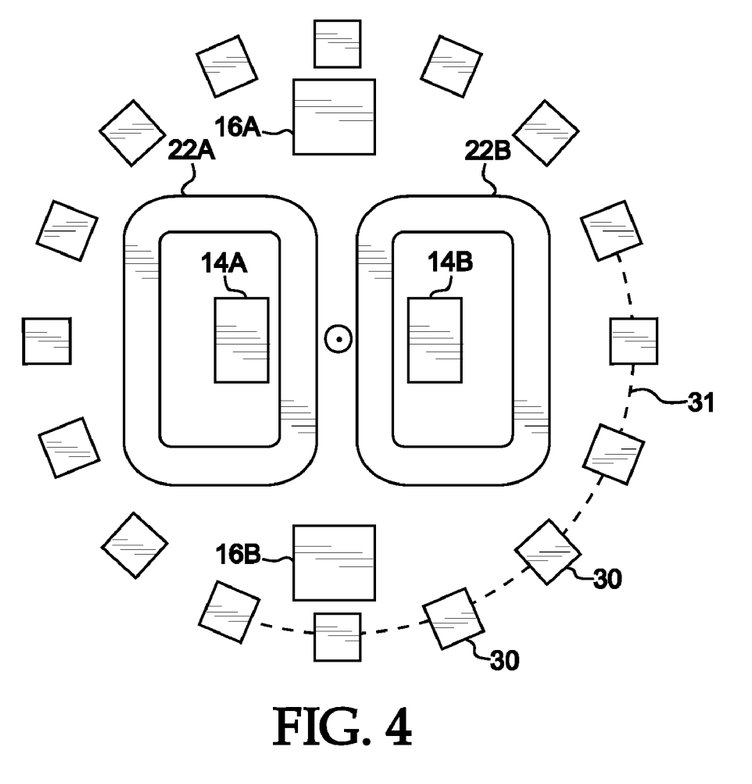
FIG. 4 is a top plan view of a magnetic levitation system having magnets to improve stability of a levitated magnetic element against rotation.

FIG. 4 shows an arrangement of additional magnets 30 which increases the strength of the magnetic field at equilibrium location 13 but does not adversely affect the magnetic field gradients which create the forces used to maintain magnetic element 12 at equilibrium location 13. Additional magnets 30 are arranged in a ring 31. Each additional magnet 30 provides a magnetic dipole oriented in the same sense as magnets 14.

Ring 31 lies in plane 18 or in a plane parallel to plane 18. Equilibrium location 13 lies on a line extending perpendicular to the plane of ring 31 from the center of ring 31. The radius of ring 31 is chosen so that the z component of the magnetic field produced by magnets 30 has substantially no gradient in the z direction at equilibrium location 13 (i.e. at equilibrium location 13, dB(30)z/dz=0) where B(30)z is the z component of the magnetic field produced by magnets 30. In this context, "substantially no gradient" means a gradient which is at least significantly less than, preferably less than 25% of and most preferably less than 7% of, the gradient of the static magnetic field produced by magnets 14 and 16 which cause magnetic element 12 to levitate at equilibrium location 13. By virtue of symmetry of the magnets in ring 31 about the z axis, there are no net horizontal components of the magnetic field produced by magnets 30 at equilibrium location 13 that would cause magnetic element 12 to align itself in any direction but parallel to the z axis.

Figure 5:
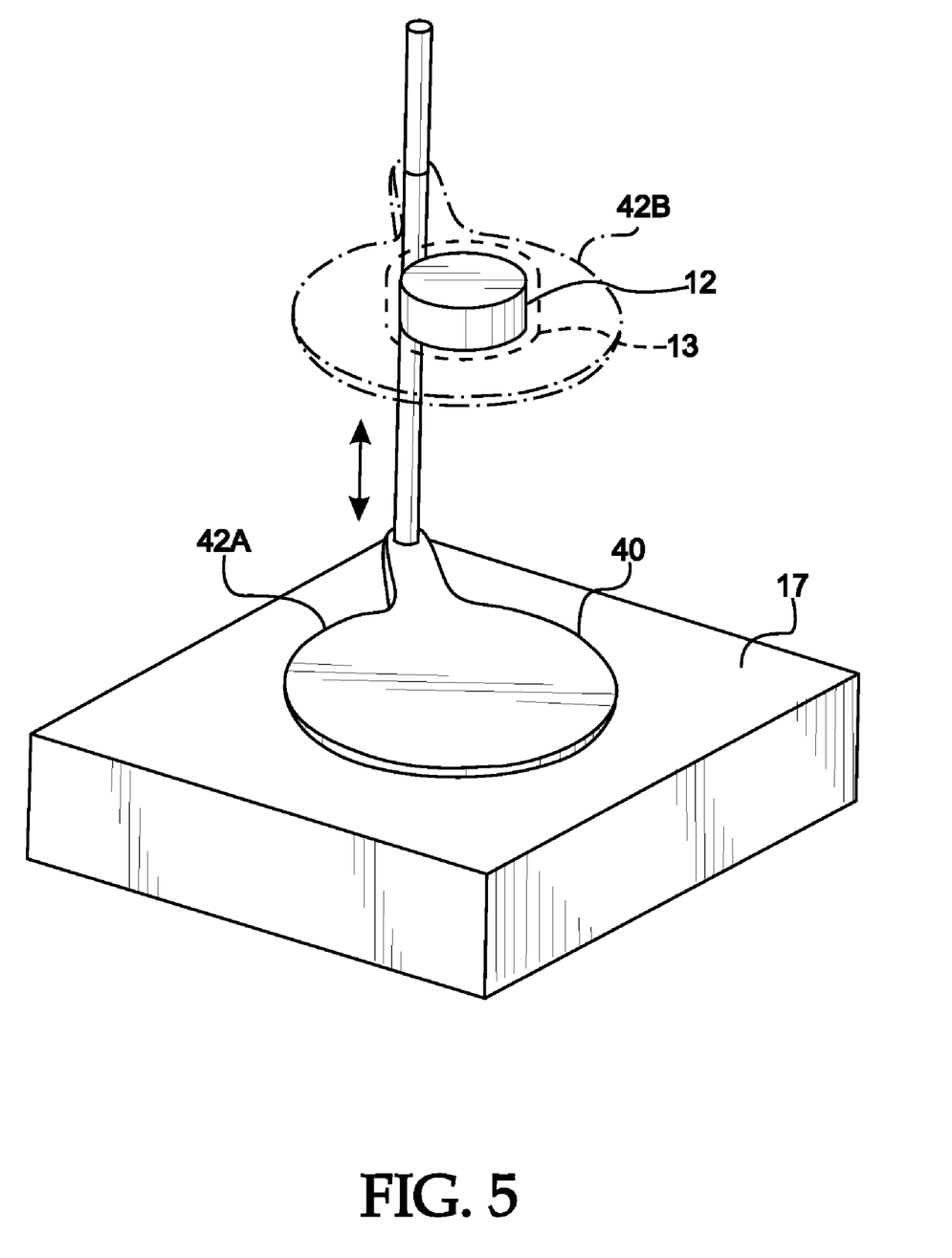
FIG. 5 is a side view of a magnetic levitation system having a movable platform for supporting a magnetic element near an equilibrium location.

System 10 may be started by initially supporting magnetic element 12 in the vicinity of equilibrium location 13, engaging controller 24 and then removing whatever support is used to provide initial support to magnetic element 12. For example, system 10 may include a non-magnetic support 40 which is movable relative to magnets 14 and 16 between a lowered position 42A and a raised position 42B as shown in FIG. 5. When support 40 is in its raised position 42B it supports magnetic element 12 at equilibrium location 13. After system 10 is operating to maintain magnetic element 12 at equilibrium location 13, support 40 can be lowered to position 42A.

Support 40 may comprise an arm, a table, a column, or the like. Support 40 is movable between a first position in which it supports magnetic element 12 at or near equilibrium location 13 and a second position in which it is out of the way of equilibrium location 13. Any suitable mechanism may be provided to enable support 40 to move between the first and second positions. The mechanism may comprise, for example, one or more hinges, pivots, sliding members, flexible members, or the like.

Figure 1B:
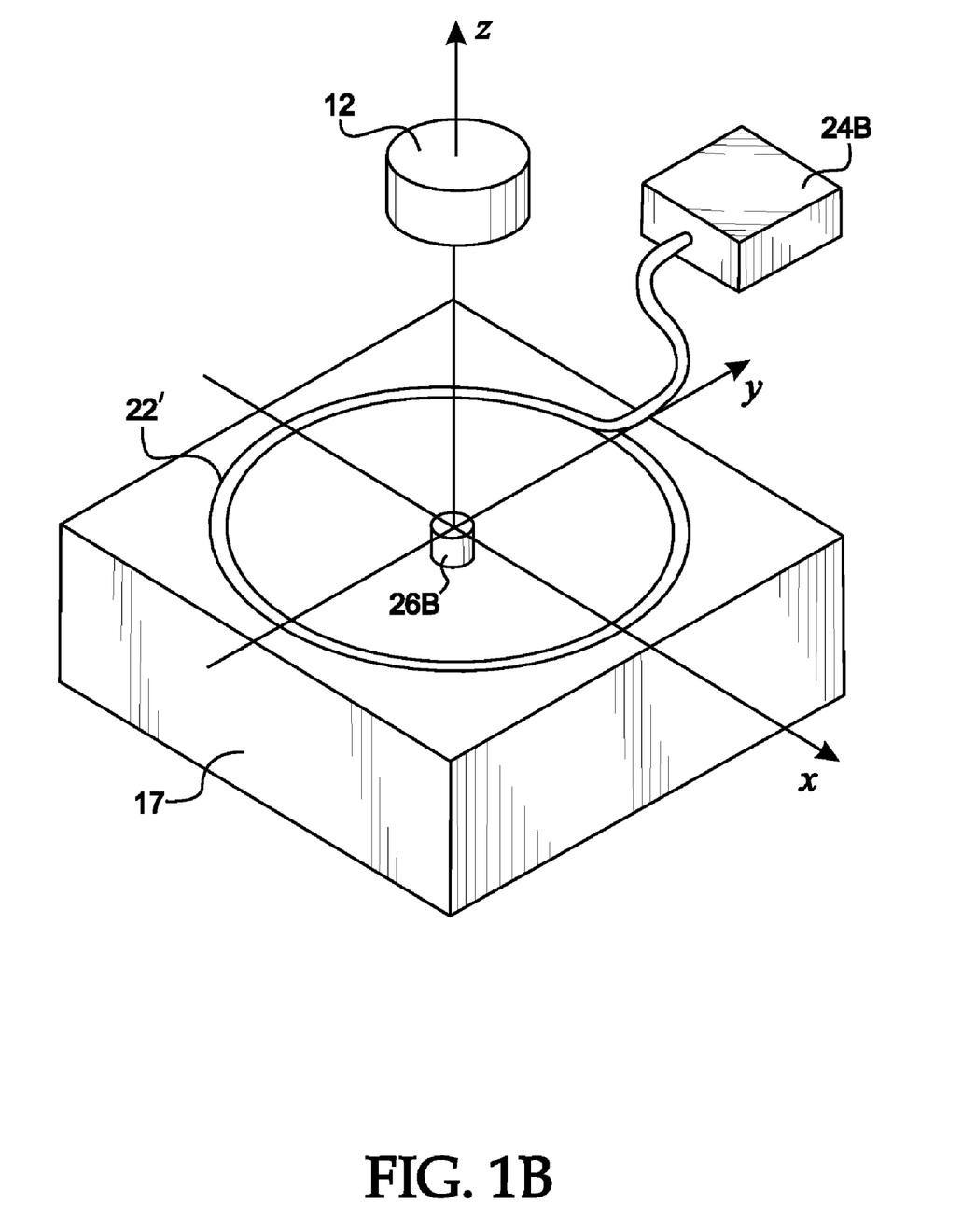

As shown in FIG. 1B, system 10 may optionally include one or more secondary electromagnets 22'. Secondary electromagnets 22' may be used to further stabilize magnetic element 12. For instance, an electromagnet that is symmetric about the z axis and is located parallel to plane 18 can generate a magnetic field gradient parallel to the z axis that augments the static magnetic field from magnets 14 and 16. This magnetic field gradient will generate a force on the magnetic element 12 in a direction parallel to the z axis. The magnitude and sense of the force is controlled by the electric current flowing in secondary electromagnet 22'. A secondary sensor 26B oriented to detect motion of the magnetic element along the z axis provides feedback to a secondary controller 24B (which could be an independent control pathway provided by the same hardware/software used to provide controller 24 or could be a separate independent controller). Controller 24B controls the electric current flow in secondary electromagnet 22'. The secondary electromagnet system may be used to dampen vibration of magnetic element 12 along the z axis or to cause magnetic element 12 to move in the +z or −z direction about equilibrium location 13. By repeatedly reversing the flow of current in secondary electromagnet 22' at an appropriate rate, controller 24B can cause magnetic element 12 to oscillate about equilibrium location 13 along the z axis.

Electromagnets in other orientations with appropriate feedback sensors may be provided in conjunction with suitable controllers to provide forces on the magnetic element 12 along they axis or to provide magnetic torques on magnetic element 12. In this manner, the levitated element can be steered around the equilibrium location to a limited degree or made to vibrate in some direction.

Figure 6:
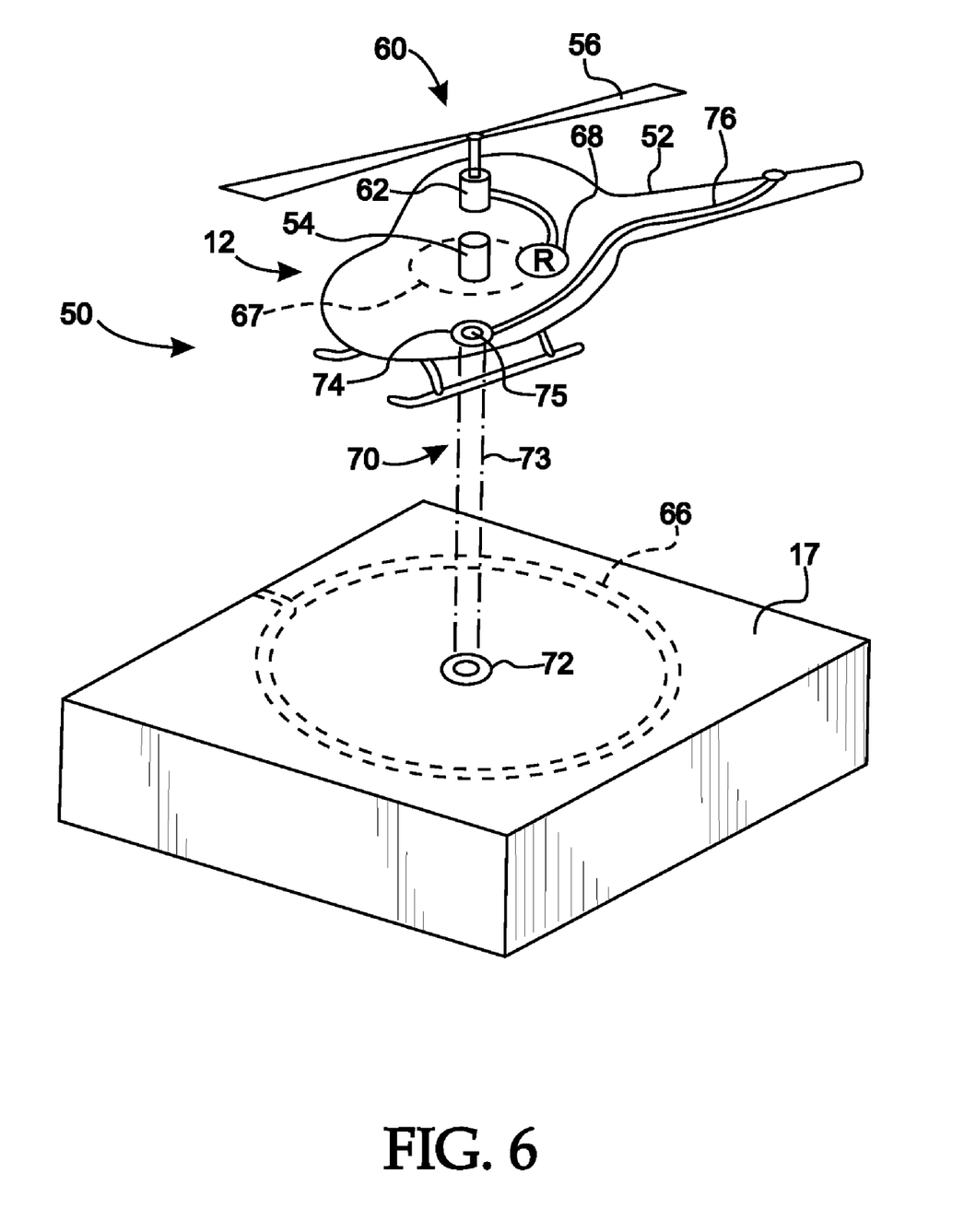
FIG. 6 shows mechanisms for illuminating and animating a levitated object.

System 10 may include mechanisms to animate or illuminate magnetic element 12. FIG. 6 shows a novelty toy 50, which includes a mechanism for animating magnetic element 12, and a system for illuminating magnetic element 12. FIG. 6 omits details of the mechanism for levitating magnetic element 12 for clarity. The levitation mechanism may be enclosed within base 17.

In toy 50, magnetic element 12 comprises a lightweight shell 52 resembling the body of a helicopter. A permanent magnet 54 is affixed within shell 52. Magnet 54 interacts with a levitation system, as described above, to levitate magnetic element 12 at an equilibrium location. Toy 50 includes an animation mechanism 60. Animation mechanism 60 comprises a small electric motor 62 which drives a rotor 56. Motor 62 is powered by electrical power supplied by way of a high frequency coupling system. The coupling system may comprise an air core transformer. A transmitting coil 66 mounted in base 17 is excited with high frequency (e.g. radio frequency) electrical signals. A signal emitted by transmitting coil 66 is coupled to a receiving coil 67 in magnetic element 12. This induces electrical currents in receiving coil 67. The electrical currents are rectified by a rectifier circuit 68 to produce electricity which drives motor 62. Electricity from rectifier circuit 68 could be used to power electrical devices other than or in addition to motor 62. For example, the electricity could be used to operate small lamps (which could be, for example, light-emitting diodes (LEDs)).

Toy 50 also includes an illumination system 70. Illumination system 70 comprises a high intensity light source 72 in base 17. Light source 72 generates a beam 73 of light. Beam 73 illuminates a light receptor 74 on magnetic element 12. In the illustrated embodiment, light receptor 74 comprises a lens 75 which focuses light from beam 73 into a bundle of optical fibers 76. Optical fibers 76 extend to locations on shell 52 corresponding to navigation lights and the like. Beam 73 may be tightly confined so that it is not readily apparent to a person observing toy 50. Mirrors, diffusers or other optical elements may be used to direct light from light receptor 74 to illuminate surface features of magnetic element 12 instead of or in addition to optical fibers 76.

Where a component (e.g. a magnet, assembly, device, circuit, etc.) is referred to above, unless otherwise indicated, reference to that component (including a reference to a "means") should be interpreted as including as equivalents of that component any component which performs the function of the described component (i.e., that is functionally equivalent), including components which are not structurally equivalent to the disclosed structure which performs the function in the illustrated exemplary embodiments of the invention.

As will be apparent to those skilled in the art in the light of the foregoing disclosure, many alterations and modifications are possible in the practice of this invention without departing from the spirit or scope thereof. For example:

In the illustrated embodiments, the magnetic dipole moments of magnets 14 and 16 are parallel to one another. In some embodiments of the invention, magnets 14 and/or 16 are oriented so that their magnetic dipole moments lie at acute angles to plane 18.

In the illustrated embodiment, the uppermost poles of magnets 14 and 16 are co-planar and all lie adjacent to a plane 18. Magnets 14 and 16 are not necessarily co-planar.

In the illustrated embodiments, the "N" poles of magnets 14 and 16 face equilibrium location 13. The polarity of magnets 14 and 16 could be reversed so that "S" poles of magnets 14 and 16 face equilibrium location 13.

Control coils 22 are not necessarily formed of a plurality of discrete coils. A single winding may be arranged to provide a magnetic field substantially the same as the magnetic field provided by a number of discrete coils.

Additional rings of magnetic dipoles concentric with ring 31 may be provided. Since it is preferred that the ring (s) produce a magnetic field for which dB(30)z/dz=0 at equilibrium location 13, where there are rings of different diameters, each ring is preferably located at a different distance from equilibrium location 13 to keep dB(30)z/dz=0.

Ring 31 may comprise one or more ring magnets instead of discrete dipoles.

Magnets 14 and/or magnets 16 could be replaced by an arrangement of symmetrically arranged smaller magnets which produce a similar magnetic field. However, it is generally desirable to use fewer discrete magnets, rather than more so as to minimize the space taken up by magnets.

Figure 8A:
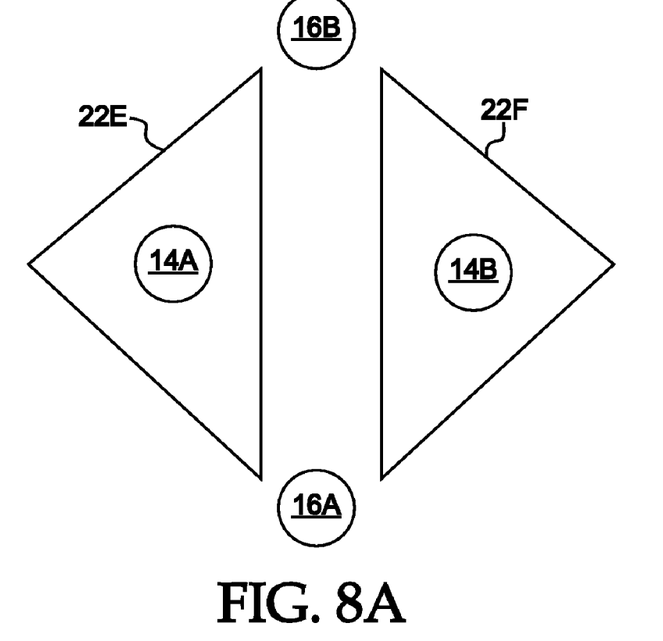
Figure 8B:
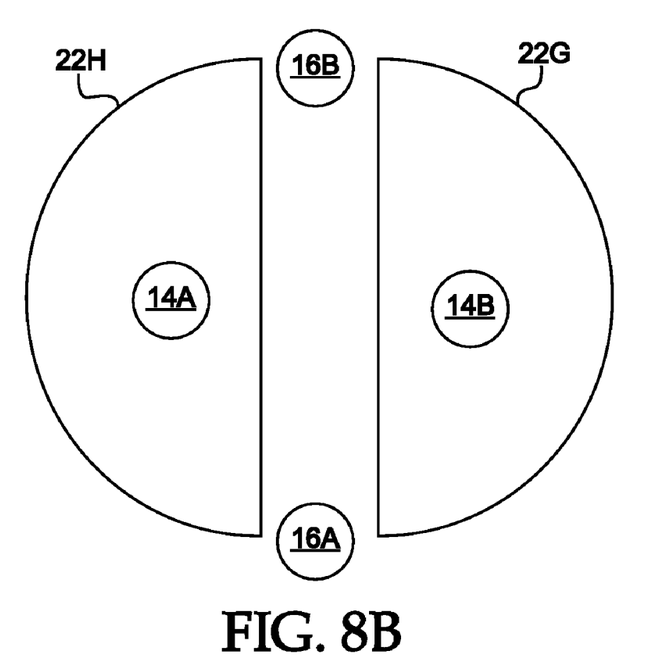

While coils 22 have been illustrated as being rectangular, other coil shapes could also be used to generate a stabilizing magnetic force on magnetic element 12. For example, the coils could be triangular like coils 22E and 22F of FIG. 8A or semicircular like coils 22G and 22H of FIG. 8B.

Any suitable non-contact sensor may be used for sensor 26. Sensor 26 could, for example, comprise a suitable optical, capacitative, or other sensor. Sensor 26 may detect the position of magnetic element 12 along the unstable axis in any suitable manner. In preferred embodiments, sensor 26 is of a type that can detect motion of magnetic element 12 along the unstable axis from a location that is removed from equilibrium location 13 by a distance equal to the distance between plane 18 and equilibrium location 13.

Accordingly, the scope of the invention is to be construed in accordance with the substance defined by the following claims.

What is claimed is:

1. An apparatus for levitating a magnetic element, the apparatus comprising:
    at least three magnets defining a substantially common plane having a longitudinal axis and a latitudinal axis and adapted to generate a static magnetic field at an equilibrium location spaced apart from the substantially common plane, wherein the static magnetic field is substantially stable in the direction of the longitudinal axis and substantially unstable in the direction of the latitudinal axis;
    a position sensor adapted to generate a feedback signal indicative of the location of the magnetic element relative to the equilibrium location;
    an electromagnet adapted to generate a control magnetic field to control motion of the magnetic element relative to the equilibrium location; and
    a controller connected to the position sensor and the electromagnet and adapted to receive the feedback signal from the position sensor and to control the electromagnet in response thereto.

2. The apparatus of claim 1, wherein one of the at least three magnets comprises a ring magnet.

3. The apparatus of claim 2, wherein the ring magnet comprises a unitary ring magnet.

4. The apparatus of claim 1, wherein the at least three magnets comprise a plurality of discrete dipoles arranged in a ring formation.

5. The apparatus of claim 1, wherein one of the at least three magnets comprises an electromagnet.

6. The apparatus of claim 1, wherein two of the at least three magnets comprise electromagnets.

7. The apparatus of claim 1, wherein one of the at least three magnets comprise a ring magnet, and wherein another of the at least three magnets comprises an electromagnet.

8. The apparatus of claim 7, wherein the ring magnet comprises a unitary ring magnet.

9. An apparatus for levitating a magnetic element, the apparatus comprising:
    at least two magnets adapted to generate a static magnetic field at an equilibrium location spaced apart from the at least two magnets, the static magnetic field being substantially stable in a first direction and substantially unstable in a second direction substantially orthogonal to the first direction, wherein one of the at least two magnets comprises a ring magnet;

a position sensor adapted to generate a feedback signal indicative of the location of the magnetic element relative to the equilibrium location;

an electromagnet adapted to generate a control magnetic field to control motion of the magnetic element relative to the equilibrium location; and a controller connected to the position sensor and the electromagnet and adapted to receive the feedback signal from the position sensor and to control the electromagnet in response thereto.

10. The apparatus of claim 9, wherein the ring magnet comprises a unitary ring magnet.

11. The apparatus of claim 9, wherein the ring magnet comprises a plurality of discrete dipoles.

12. The apparatus of claim 9, further comprising a third magnet disposed in a substantially common plane with the at least two magnets.

13. The apparatus of claim 12, wherein the third magnet comprises an electromagnet.

14. The apparatus of claim 13, wherein one of the at least two magnets is an electromagnet.

15. The apparatus of claim 13, wherein the third magnet and the one of the at least two magnets are disposed anterior to the ring magnet.

16. An apparatus for levitating a magnetic element, the apparatus comprising:

a ring magnet disposed in a plane having a longitudinal axis and a latitudinal axis, the ring magnet adapted to generate a static magnetic field at an equilibrium location spaced apart from the common plane, wherein the static magnetic field defines a substantially minimized magnetic field gradient in a direction orthogonal to the plane;

a position sensor adapted to generate a feedback signal indicative of the location of the magnetic element relative to the equilibrium location;

an electromagnet connected to the position sensor and adapted to generate a control magnetic field to control motion of the magnetic element relative to the equilibrium location; and a controller connected to the position sensor and the electromagnet and adapted to receive the feedback signal from the position sensor and to control the electromagnet in response thereto.

17. The apparatus of claim 16, wherein the ring magnet comprises a unitary ring magnet.

18. The apparatus of claim 16, wherein the ring magnet comprises a plurality of discrete dipoles.

19. The apparatus of claim 16, wherein the electromagnet is disposed in a substantially common plane with the ring magnet.

20. The apparatus of claim 19, wherein the electromagnet comprises a coil.

21. The apparatus of claim 16, wherein the electromagnet is disposed within the ring magnet.

22. The apparatus of claim 19, further comprising a third magnet disposed in a substantially common plane with the electromagnet and the ring magnet.

23. The apparatus of claim 22, wherein the third magnet comprises a second electromagnet.

24. The apparatus of claim 23, wherein the second electromagnet is disposed within the ring magnet.

25. An apparatus for levitating a magnetic element, the apparatus comprising:

a ring magnet disposed in a plane having a longitudinal axis and a latitudinal axis, the ring magnet adapted to generate a static magnetic field at an equilibrium location spaced apart from the plane, wherein the static magnetic field has substantially no gradient in a direction orthogonal to the plane;

a position sensor adapted to generate a feedback signal indicative of the location of the magnetic element relative to the equilibrium location;

first and second electromagnets disposed within the ring magnet in a substantially common plane with the ring magnet and adapted to generate a control magnetic field to control motion of the magnetic element relative to the equilibrium location; and a controller connected to the position sensor and the first and second electromagnets and adapted to receive the feedback signal from the position sensor to control the first and second electromagnets in response thereto.

* * * * *

(12) EX PARTE REEXAMINATION CERTIFICATE (8604th)
United States Patent
Davis et al.

(10) Number: US 7,505,243 C1
(45) Certificate Issued: Oct. 4, 2011

(54) MAGNETIC LEVITATION APPARATUS

(76) Inventors: Harold Davis, Vancouver (CA); Lorne A. Whitehead, Vancouver (CA)

Reexamination Request:
No. 90/009,879, Feb. 28, 2011

Reexamination Certificate for:
Patent No.: 7,505,243
Issued: Mar. 17, 2009
Appl. No.: 11/958,954
Filed: Dec. 18, 2007

Related U.S. Application Data (63) Continuation of application No. 10/529,507, filed as application No. PCT/CA03/01501 on Sep. 29, 2003, now Pat. No. 7,348,691.
(60) Provisional application No. 60/413,881, filed on Sep. 27, 2002.

(51) Int. Cl.
*H01H 47/00* (2006.01)

(52) U.S. Cl. .................................................. 361/144
(58) Field of Classification Search .................. 361/144
See application file for complete search history.

(56) References Cited

U.S. PATENT DOCUMENTS 4,585,282 A 4/1986 Bosley

*Primary Examiner* — Robert Nasser (57) ABSTRACT

A magnetic levitation apparatus supports a magnetic element in a magnetic field. A control system controls a variable magnetic field to maintain the magnetic element at an equilibrium location relative to an unstable axis. In some embodiments the variable magnetic field has a gradient in the direction of the unstable axis but no field component. In some embodiments the magnetic field is provided by an array of four discrete magnets. In some embodiments additional magnets provide increased field intensity at the equilibrium location this increases stability of the levitated magnetic element against overturning. Light and electrical power may be supplied to the levitating magnetic element.

EX PARTE REEXAMINATION CERTIFICATE ISSUED UNDER 35 U.S.C. 307

NO AMENDMENTS HAVE BEEN MADE TO THE PATENT

AS A RESULT OF REEXAMINATION, IT HAS BEEN DETERMINED THAT:

The patentability of claim 1-25 is confirmed.

* * * * *